May 24, 1927. 1,629,935
R. H. STOBBE
AUTOMOBILE TOP AND CURTAIN CONSTRUCTION
Filed Jan. 20, 1925 2 Sheets-Sheet 1
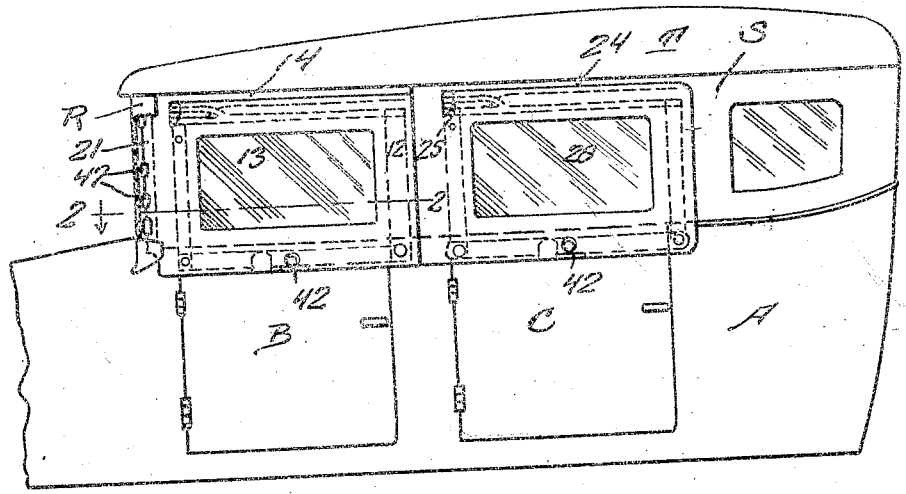
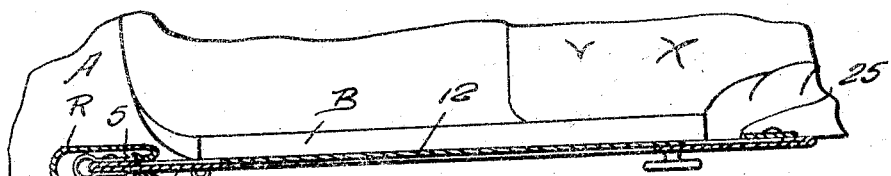
Inventor
R. H. Stobbe May 24, 1927.
R. H. STOBBE
1,629,935
AUTOMOBILE TOP AND CURTAIN CONSTRUCTION
Filed Jan. 20, 1925
2 Sheets-Sheet 2
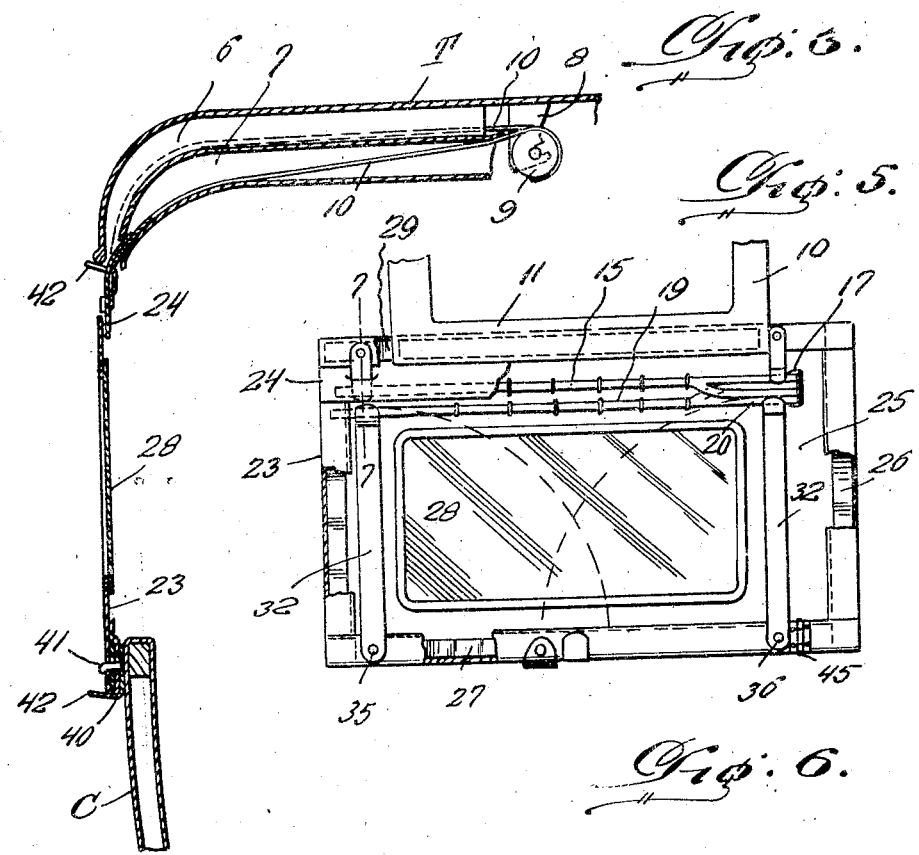
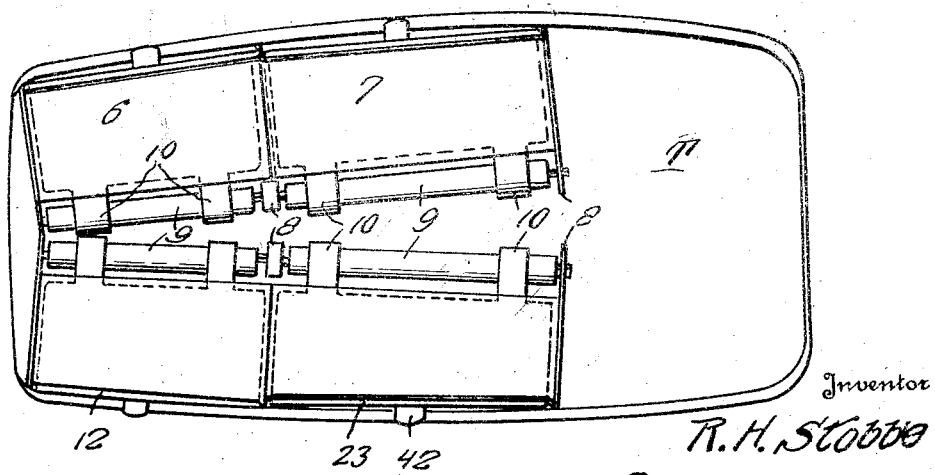
Inventor
R. H. Stobbe Patented May 24, 1927.

1,629,935

UNITED STATES PATENT OFFICE.

RUDOLPH HENRY STOBBE, OF ST. CLAIRSVILLE, OHIO.

AUTOMOBILE TOP AND CURTAIN CONSTRUCTION.

Application filed January 20, 1925. Serial No. 3,622.

The present invention relates to an improved top construction for automobiles and like vehicles wherein curtains are pro ded which may be easily and quickly moved to either a closed or open position.

Another important object of the invention is to provide a combined structure of this nature wherein, when the curtains are closed, they may be hinged with the doors of the automobile or like vehicle so that a quick entrance or exit may be made.

Another very important object of the invention is to provide a curtain structure which has incorporated therein means whereby the curtain may be stiffened when in a closed position so that it may freely and properly swing with the door of the vehicle, said stiffening means being movable to a position which will allow the curtain to have proper flexibility when being moved to its open or out-of-the way position.

A still further very important object of the invention is to provide a construction of this nature which is both simple and efficient, one which is reliable in use and operation, inexpensive to manufacture and construct, easy to manipulate, not liable to readily get out of order, strong, durable, and well adapted for the purpose for which it is designed.

With the above and numerous other objects in view as will appear as the description proceeds, the invention resides in certain novel features of construction, and in the combination and arrangement of parts that will hereinafter be more fully described and claimed.

In the drawing

Figure 1 is a fragmentary side elevation of an automobile body showing my improved top and curtain structure incorporated therein, Fig. 2 is a fragmentary horizontal section on an enlarged scale taken substantially on the line 2—2, of Fig. 1, looking downwardly, Fig. 3 is a detail vertical section through one side of the top and a portion of the body showing the improved curtain structure, Fig. 4 is a plan view of the inside of one of the front curtains, Fig. 5 is a similar view of one of the rear curtains, Fig. 6 is a bottom plan view of the top, and Fig. 7 is an enlarged detail view taken substantially on the line 7—7, of Fig. 5.

Referring to the drawing in detail it will be seen that A designates the body of an automobile which is provided with the front door B and the rear door C on one side as is usual. In this description I shall only refer to one side of the body in view of the fact that the other side is identical therewith. The top T is more or less of conventional type, being of the permanent variety and at the rear is provided with permanent sides S adjacent the rear seat.

The front of this top T is supported by the wind-shield standards R which are of a hollow construction as is shown to advantage in Fig. 2 and the rear sides thereof are slotted as is indicated at 5 for a purpose which will become evident as the description proceeds.

In Figs. 3 and 6 it will be noted that compartments 6 and 7 are provided on each side of the top T and extend from the side edge thereof to a distance from the median longitudinal dimension of the top. The compartment 6 is disposed above the compartment 7 and forwardly thereof. The compartment 6 receives the front curtain and the compartment 7 the rear curtain of the corresponding side of the car. Curtain brackets of suitable form are depended from the top T and support curtain rollers 9 of conventional construction. The rollers 9 are alined with each other and are adapted to receive for winding thereon flexible strips or belts 10 preferably formed substantially U-shaped so that the intermediate portions 11 may be attached to the curtains while the leg portions may wind about the rollers, the ends being fixed thereto by any suitable means.

The front curtain structure is shown to advantage in Fig. 4 and includes the curtain proper 12 having therein a transparency of suitable material indicated at 13, a frame portion 14 which overlaps the inner surface of the curtain proper 12 and a vertical strip 21. A hinge bar 15 is hinged to a hinge pin 17. The hinge bar 15 is fixed to this frame portion 14 by suitable fastening elements 18. A similarly constructed hinge bar 19 is supported along the upper edge of the curtain proper 12 by means of fastening elements 18 and is hinged to the hinge pin 17. The frame portion or strip 14 is formed as a part of the vertically extending edge strip 21 as is also the curtain proper 12.

The lower edge of the curtain proper 12 is provided with a stiffening rod 22. In Fig. 5 the structure of the rear curtain is shown to advantage. The rear curtain includes the curtain proper 23 and the frame portion or strip 24, both of which are connected to the vertically extending strip 25 which is stiffened by a resilient and flexible rod 26. The lower edge of the curtain proper 23 is also stiffened by a similar rod 27. A transparency 28 is provided in the curtain proper 23. A hinge bar 15 is provided in the frame strip 24 as in the front curtain and a hinge bar 19 is provided adjacent the upper edge of the curtain proper 23 as in the front curtain.

The frame strips 14 and 24 are sewed or otherwise permanently attached to the intermediate portion 11 of the flexible belts 10 and the upper edges of the strips 14 and 24 are stiffened by resilient flexible rods 29 shown in full lines in Fig. 5. As is shown to advantage in Figs. 4 and 5 taken with Fig. 7, the strips 14 and 24 are provided at their free ends and strip 24 at its hinged end, with pivoted rods 30 having bifurcated lower ends 31 for receiving the hinge bars 15, thereby vertically stiffening these strips.

The curtains proper are provided with pivoted stiffening bars 32 which terminate at their free ends in bifurcations 33. One of these bars 32 is pivoted as at 34 to the rear lower corner of the front curtain proper 12 and at both of the lower corners as at 35 and 36 of the rear curtain proper 23. These bars 32 may be supported in a horizontal position as shown in Fig. 4, thus resting in clips 37 or they may be swung to the vertical position shown in Fig. 5 at which time the bifurcated ends 33 engage the hinge bars 19 as is disclosed to advantage in Fig. 7.

These bars 32 are adapted to be disposed in their vertical positions when the curtains are closed and in their horizontal positions when the curtains are opened or about to be moved to their open positions. When the curtains are closed the angular plate 40 is provided with an opening for receiving a suitable pin 41 extended from the respective door of the automobile body.

These angular plates 40 are provided with outwardly extending flanges or extensions 42 which are adapted to engage the edge of the top when the curtains are in an open position within the compartments 6 and 7 so as to limit the upward movement thereof and thus the spring rollers 9 will normally hold the curtains in the compartments 6 and 7 when the plates 40 are disengaged from pins 41. The stiffening rod 27 which extends through the bottom portion of the curtain proper 23 and the strip 25 is formed in sections hinged as at 45. This strip 25 overlaps the inner side of the curtain proper 12 when the curtains are in a closed position.

Granting that the curtains are in their open position and it is desired to close them, it is only necessary to pull downwardly upon the curtain by grasping the extensions 42 and engaging the plates 40 with the pins 41. Then from the inside of the body the stiffening bars 32 may be disposed vertically as previously described so as to give the proper stiffness to the curtains in order that they may swing with the doors B and C when they are opened. The rear curtain is disposed in the lower compartment and the front curtain in the upper compartment in order that when the curtains are lowered the strip 25 will be disposed inside of the free end of the curtain 12. The strip 21 slides in the respective standard R and is provided with looped elements 47 for preventing the accidental removal of this strip 21 from the respective standard R and also to prevent its removal as the front door B is being swung to an open position.

When it is desired to open the curtains the bars 32 are swung to their horizontal position such as is indicated in Fig. 4 so as to give sufficient flexibility to the curtains in order that they may be pulled into their respective compartments 6 and 7 by the conventional spring rollers 9 after having been released from engagement with pins 41. It is thought that the operation and construction of the invention will be readily understood without a more detailed description thereof. It will be apparent from the present embodiment of the invention which I have described in considerable detail, that the device has a structure which, when the curtains are closed the combined top and curtains form practically a closed automobile and the doors thereof may be easily opened so that the curtains swing therewith in order that easy exit and entrance may be made without necessity of raising the curtains.

It will also be apparent that I have provided efficient means for stiffening the curtains when in their closed position in order that they may efficiently swing with the doors as though they were upper parts thereof.

The preferred embodiment of the invention which I have described possesses a very simple and efficient construction which embodies all of the features of advantage enumerated as desirable in the statement of the invention and the above description. It is evident, however, that numerous changes in the details of construction, in the materials, and in the combination and arrangement of parts may be resorted to without departing from the spirit or scope of the invention as hereinafter claimed or sacrificing any of its advantages.

Having thus described my invention, what I claim as new is:—

In a curtain structure of the class described, a frame comprising a horizontal portion and a vertical portion, a curtain swingably attached to the vertical portion, a hinge bar attached to and extending longitudinally of the horizontal portion, a second hinge bar extending longitudinally of and fixed to the upper edge of the curtain, the ends of the hinge bars adjacent the vertical portion being pivoted together, a pair of arms pivoted at their lower ends in spaced relation to the lower edge of the curtain and having their upper ends bifurcated, the bifurcated ends of the arms being adapted to receive the hinge bar on the curtain.

In testimony whereof I affix my signature.

RUDOLPH HENRY STOBBE.